United States Patent
Cochart et al.

(10) Patent No.: US 10,030,782 B2
(45) Date of Patent: Jul. 24, 2018

(54) DISPENSING DEVICE AND BATTERY PACKAGE

(71) Applicant: Kohler Co., Kohler, WI (US)

(72) Inventors: Chad J. Cochart, Sheboygan, WI (US); Joel T. Smith, Cedarburg, WI (US); Balachander Venugopal, Sheboygan, WI (US); Ryan F. Leichty, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 15/004,596

(22) Filed: Jan. 22, 2016

(65) Prior Publication Data

US 2016/0245418 A1 Aug. 25, 2016

Related U.S. Application Data

(63) Continuation of application No. 13/802,412, filed on Mar. 13, 2013, now abandoned.
(Continued)

(51) Int. Cl.
*E03C 1/05* (2006.01)
*F16K 21/00* (2006.01)
(Continued)

(52) U.S. Cl.
CPC ............ *F16K 21/00* (2013.01); *A47K 5/1217* (2013.01); *E03C 1/057* (2013.01); *E03D 3/04* (2013.01);
(Continued)

(58) Field of Classification Search
CPC .... E03C 1/057; F16K 31/402; H01M 2/0255; H01M 2/1055
(Continued)

(56) References Cited

U.S. PATENT DOCUMENTS 4,554,687 A 11/1985 Carter et al.
4,793,588 A 12/1988 Laverty, Jr.
(Continued)

FOREIGN PATENT DOCUMENTS

CN 101519889 A 9/2009
CN 101657941 A1 2/2010
(Continued)

OTHER PUBLICATIONS

Tadiran, Product Specifications. PulsesPlus™ batteries for high current pulse applications, (Internet Archive Wayback Machine) [online], Jun. 27, 2009, [retrieved on Dec. 1, 2016]. Retrieved from the internet <URL: http://web.archive.org/web/20090627155238/ http://www.tadiranbat.com/index.php/pulsespluslithiumcells>.*
(Continued)

*Primary Examiner* — Matthew W Jellett
(74) *Attorney, Agent, or Firm* — Michael Best & Friedrich LLP

(57) ABSTRACT

A fluid dispensing device, a battery package for a fluid dispensing device, and a method of assembling a fluid dispensing device. The dispensing device has a housing defining a passage having an outlet, and fluid being dispensed through the passage and out of the outlet. The dispensing device also has a powered component. The battery package has a battery cell and a capacitor operable to power the powered component. The battery cell and the capacitor are encapsulated as a unitary battery package. The unitary battery package is supportable in the housing.

22 Claims, 13 Drawing Sheets

Related U.S. Application Data

(60) Provisional application No. 61/719,287, filed on Oct. 26, 2012.

(51) Int. Cl.

| | | |
|---|---|---|
| *E03D 3/06* | (2006.01) | |
| *E03D 3/04* | (2006.01) | |
| *H02J 7/00* | (2006.01) | |
| *H01M 2/10* | (2006.01) | |
| *H01M 16/00* | (2006.01) | |
| *A47K 5/12* | (2006.01) | |
| *E03D 5/10* | (2006.01) | |
| *F16K 31/06* | (2006.01) | |

(52) U.S. Cl.
CPC ............... *E03D 3/06* (2013.01); *E03D 5/105* (2013.01); *F16K 31/06* (2013.01); *H01M 2/1016* (2013.01); *H01M 2/1055* (2013.01); *H01M 16/00* (2013.01); *H02J 7/00* (2013.01); *H01M 2/1094* (2013.01); *Y10T 29/49002* (2015.01)

(58) Field of Classification Search
USPC ............................................ 251/30.03–30.05
See application file for complete search history.

(56) References Cited

U.S. PATENT DOCUMENTS

| | | | |
|---|---|---|---|
| 5,169,118 A | 12/1992 | Whiteside | |
| 5,663,007 A | 9/1997 | Ikoma et al. | |
| 5,877,429 A | 3/1999 | Gauley et al. | |
| 5,979,482 A | 11/1999 | Scott | |
| 6,000,674 A | 12/1999 | Cheng | |
| 6,686,721 B1 | 2/2004 | Tzeng | |
| 6,898,552 B2 | 5/2005 | Marcichow | |
| 7,156,363 B2 | 1/2007 | Parsons et al. | |
| 7,177,725 B2 | 2/2007 | Nortier et al. | |
| 8,364,546 B2 | 1/2013 | Yenni et al. | |
| 8,895,089 B2 | 11/2014 | Sumida | |
| 2001/0020490 A1 | 9/2001 | Lorenzelli et al. | |
| 2002/0017326 A1 | 2/2002 | Lorenzelli et al. | |
| 2008/0199737 A1 | 8/2008 | Kazaryan et al. | |
| 2011/0189507 A1 | 8/2011 | Reis et al. | |

FOREIGN PATENT DOCUMENTS

| | | | | |
|---|---|---|---|---|
| CN | 106677305 A | 5/2017 | | |
| ES | 1107905 U | 4/2014 | | |
| JP | H02256730 A | 10/1990 | | |
| JP | H0390711 A | 4/1991 | | |
| JP | H0390726 A | 4/1991 | | |
| JP | H0390732 A | 4/1991 | | |
| JP | H0390734 A | 4/1991 | | |
| JP | H0390751 A | 4/1991 | | |
| JP | H0390753 A | 4/1991 | | |
| JP | 2758668 B2 | 5/1998 | | |
| JP | 2811796 B2 | 10/1998 | | |
| JP | 2841536 B2 | 12/1998 | | |
| WO | 2011097196 A2 | 8/2011 | | |
| WO | WO 2011097196 A2 * | 8/2011 | .......... | H01M 2/0255 |
| WO | 2015080544 A1 | 6/2015 | | |

OTHER PUBLICATIONS

Tadiran Lithium Batteries. Pulses Plus Model TLP-92311/A/SM. Rev. C, Dece 2004, 2 pages.*
European Search Report for Application No. EP13190399 dated Feb. 18, 2014 (8 pages).*
MSDS No.-3.6V based PP (Revision-B): Material Safety Data Sheet, Nov. 21, 2004; AED Brands, www.aedbrands.com, https://www.aedbrands.com/lifepak-cr-plus-battery-msds-sheet.pdf pp. 1-8.*
First Office Action from the State Intellectual Property Office of the People's Republic of China for Application No. 201310516938.4 dated Oct. 28, 2016 (17 pages).
Extended European Search Report for Application No. EP13190399 dated Feb. 18, 2014 (8 pages).
Tadiran Lithium Batteries. Pulses Plus. Model TLP-92311/A/SM. Rev. C, Dec. 2004, 2 pages.
Examination Report from the European Patent Office for Application No. 13190399.9 dated Mar. 29, 2017 (5 pages).

* cited by examiner

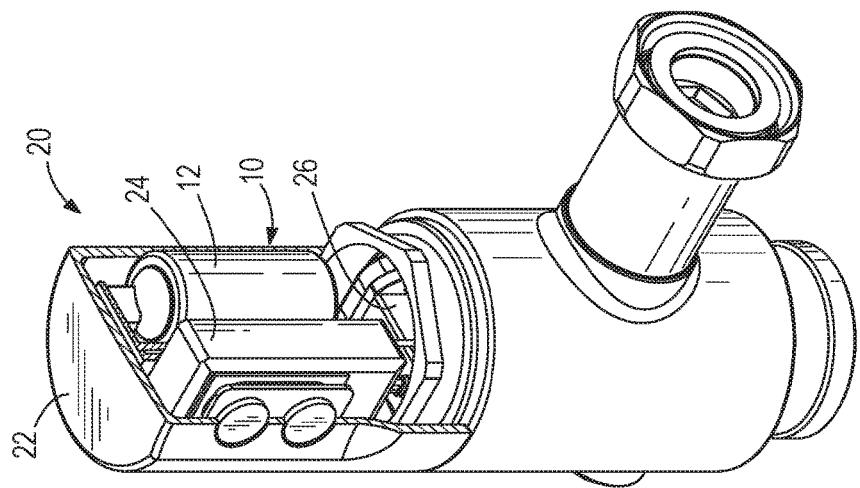
FIG. 4
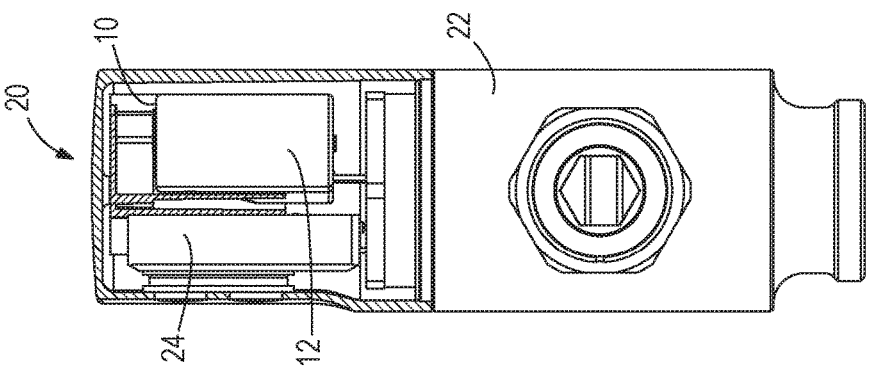
FIG. 5
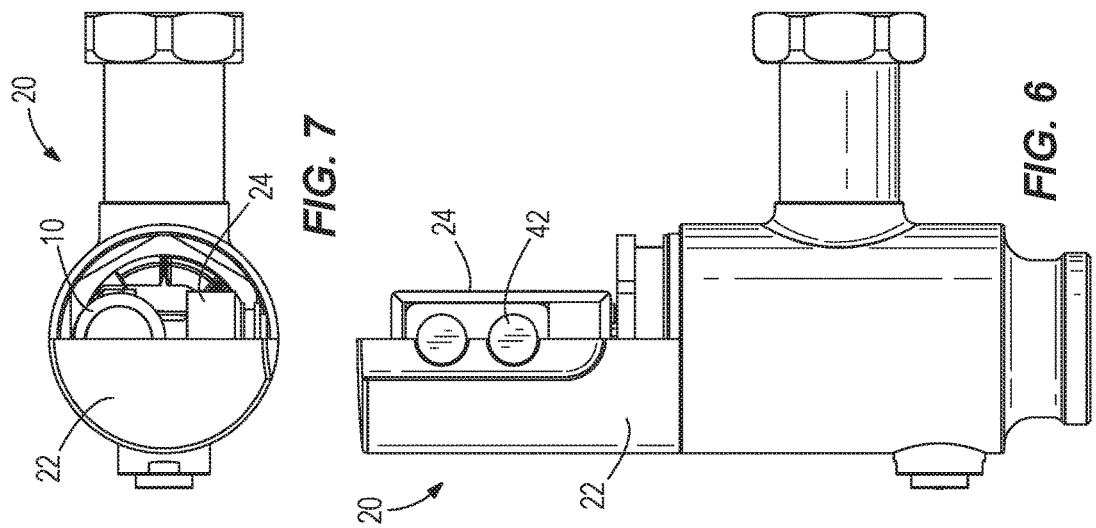
FIG. 7
FIG. 6

DISPENSING DEVICE AND BATTERY PACKAGE

RELATED APPLICATIONS

The present application is a continuation of U.S. patent application Ser. No. 13/802,412, filed Mar. 13, 2013, which claims priority to U.S. Provisional Patent Application No. 61/719,287, filed Oct. 26, 2012, the entire contents of which are hereby incorporated by reference.

FIELD

The present invention relates to a dispensing device and a battery for powering the dispensing device.

SUMMARY

A typical automatic dispensing device includes a sensor, such as a motion sensor, and a solenoid controlled based on a signal from the sensor to dispense a substance, such as a fluid.

In one independent embodiment, the invention provides a fluid dispensing device. The fluid dispensing device may generally include a housing defining a passage having an outlet, a sensor operable to sense a condition and to send a signal based on the sensed condition, a dispensing mechanism operable to dispense fluid through the passage and out of the outlet, a solenoid controlled, based on the signal from the sensor, to cause the dispensing mechanism to dispense fluid, and a hybrid battery disposed in the housing and operable to power the solenoid.

In another independent embodiment, the invention provides a battery package for a fluid dispensing device. The dispensing device includes a housing defining a passage having an outlet, fluid being dispensed through the passage and out of the outlet, and a powered component. The battery package may generally include a battery cell and a capacitor operable to power the powered component. The battery cell and the capacitor may be encapsulated as a unitary battery package, and the unitary battery package may be supportable in the housing.

In yet another independent embodiment, the invention provides a method of manufacturing a fluid dispensing device. The method may generally include providing a housing for the fluid dispensing device, the housing defining a passage having an outlet, fluid being dispensed through the passage and out of the outlet, encapsulating a battery cell and a capacitor as a unitary battery package, and supporting the unitary battery package in the housing.

In a further independent embodiment, the invention provides a fluid dispensing device. The fluid dispensing device may include a housing defining a passage having an inlet, an inlet chamber communicating with the inlet, an outlet, an outlet chamber communicating with the outlet, a pressure chamber in communication with the inlet chamber, a vent passage in selective communication between the pressure chamber and atmosphere, and an opening between the pressure chamber and the vent passage. The fluid dispensing device may also include a sensor operable to sense a condition and to send a signal based on the sensed condition, and a dispensing mechanism operable to dispense fluid through the passage and out of the outlet, the dispensing mechanism including a piston movably supported in the passage between the inlet chamber and the outlet chamber. The fluid dispensing device may also include a solenoid controlled, based on the signal from the sensor, to cause the dispensing mechanism to dispense fluid, the solenoid being operable to selectively place the pressure chamber in communication with the vent passage to thereby cause the dispensing mechanism to dispense fluid. The solenoid may include an armature movable between a first position, in which communication between the pressure chamber and the vent passage is inhibited, and a second position, in which communication between the pressure chamber and the vent passage is allowed, the armature being movable between the first position and the second position. In the first position, a portion of the armature may close the opening. The fluid dispensing device may also include a power source operable to power the solenoid.

In still another independent embodiment, the invention provides a method of manufacturing a hybrid battery for a fluid dispensing device, the hybrid battery having a battery cell and a capacitor. The method may generally include encapsulating the battery cell and the capacitor as a unitary battery package.

Other independent aspects of the invention will become apparent by consideration of the detailed description, claims and accompanying drawings.

BRIEF DESCRIPTION OF THE DRAWINGS

FIG. 4 is a perspective cutout view of a dispensing device, such as a flushometer, including the battery package shown in FIG. 1.

FIG. 5 is a side view of the flushometer shown in FIG. 4.

FIG. 6 is a front view of the flushometer shown in FIG. 4.

FIG. 7 is a top view of the flushometer shown in FIG. 4.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience and are not to be construed as limiting terms.

Figure 1:
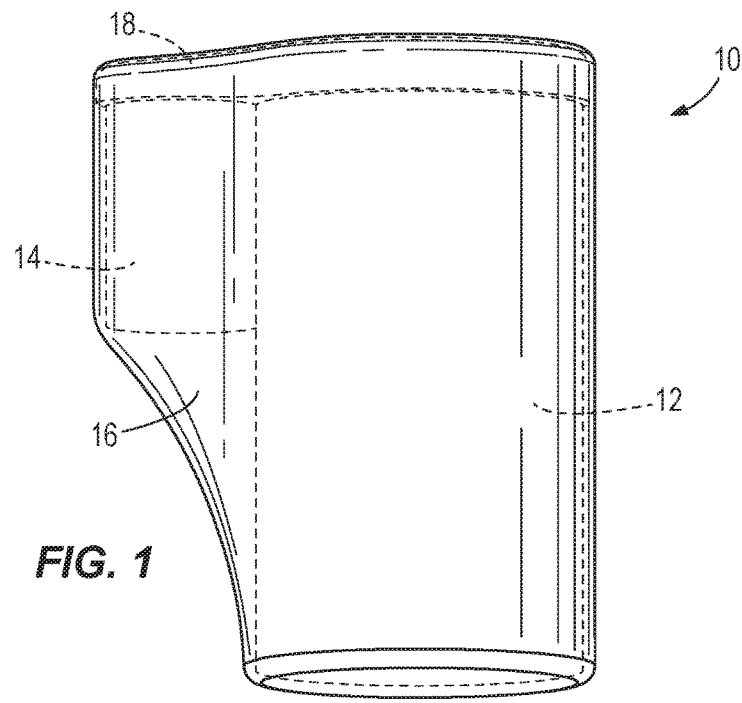
FIG. 1 is a side view of a battery package.
Figure 2:
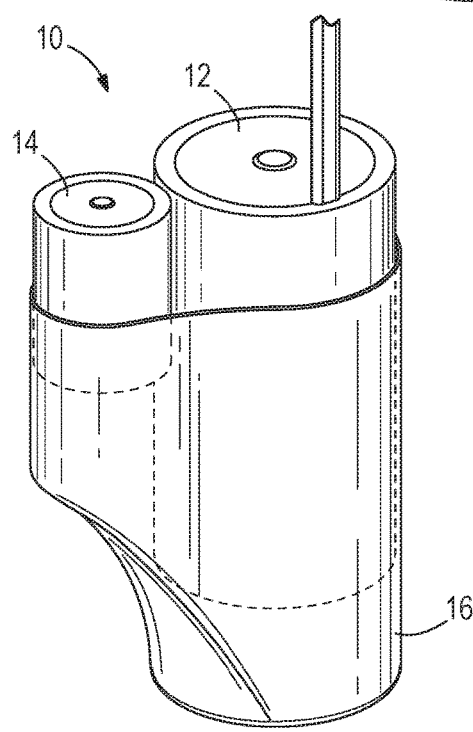
FIG. 2 is a perspective exploded view of the battery package shown in FIG. 1.
Figure 3:
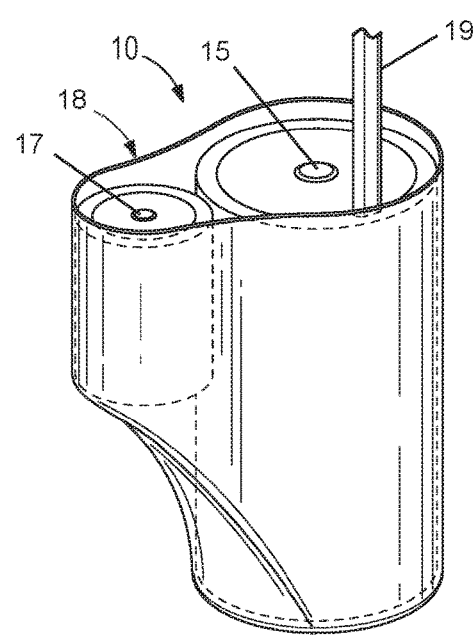
FIG. 3 is a perspective view of the battery package shown in FIG. 1 with the top removed.

FIGS. 1-3 illustrate a battery package 10 including a hybrid battery having a battery cell 12 and a capacitor 14. The battery cell 12 may include an alkaline battery, a lithium-based battery (e.g., a lithium-ion battery), etc. The capacitor 14 may include a lithium-ion capacitor, or other suitable types of capacitor. For example, the hybrid battery may include a 9 volt high purity lithium battery cell packaged with a lithium-ion capacitor.

In the illustrated construction, the battery package 10 also includes a cup 16 and resin 18. The hybrid battery (e.g., the battery cell 12 and the capacitor 14) is encapsulated, for example, within the cup 16 which is filled with the resin 18. The cup 16 may be formed of a polymer in a vacuum forming process, a thermoforming process, thin wall injection molding, etc. The resin 18 may include polyurethane, epoxy, acrylic, silicone, UV curable materials, etc., which either completely harden or form a rubber-like consistency.

In the illustrated embodiment, the cup 16 is a thin-walled molded cup and the resin 18 includes epoxy. The resin 18 fills the cup 16 and includes a top layer sealing off the top of the cup 16 that is thick enough to cover terminals 15, 17 and exposed wires or connections 19 between the battery cell 12 and the capacitor 14. As illustrated in FIG. 3, the wires 19 include a first portion encapsulated within the resin 18 and a second portion (e.g., insulated wires) passing out of the resin 18 for connection to powered components. In some embodiments, the battery package 10 also includes a cap (not shown) coupled to and sealed with the top of the cup 16 (e.g., by the resin 18) for assisting in the mounting or holding of the battery package 10 in the dispensing device 20, which will be described in greater detail below.

The cup 16 and resin 18 encapsulate the battery cell 12 and the capacitor 14 to, for example, protect the battery cell 12 and the capacitor 14 from contamination (e.g., by fluid, water, other contaminants, etc.). Encapsulating the battery cell 12 and the capacitor 14 in the cup 16 and resin 18 may also minimize the overall package size, minimize the expense of potting material (e.g., the resin 18), and/or allow for full encapsulation of the battery cell 12. Depending on the material used, for installation, the cup 16 may be retained or peeled away from the resin 18.

Figure 14:
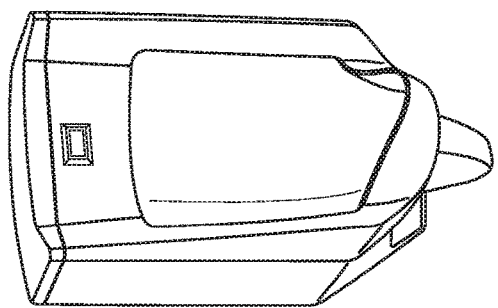
FIGS. 11-15 are perspective views of other dispensing devices, such as, for example, a soap or lotion dispenser, a commercial metered shower system, an in-wall flushometer, an in-fixture urinal flushing system, and an in-tank touchless toilet flushing system, respectively, including the battery package shown in FIG. 1.
Figure 15:
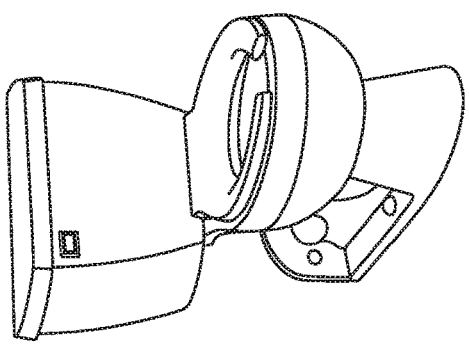
Figure 13:
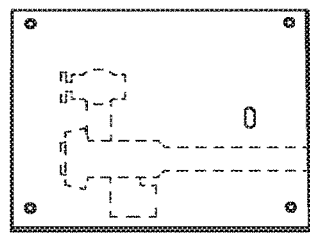
Figure 12:
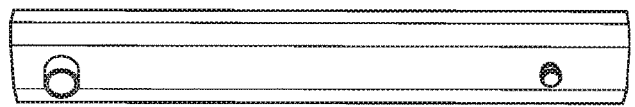
Figure 11:
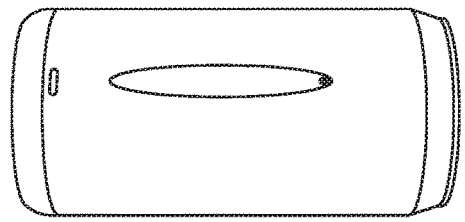

FIGS. 4-8I illustrate a dispensing device 20 including the battery package 10. The illustrated dispensing device 20 is a flushometer. In other constructions, the dispensing device 20 may include another type of dispensing device, such as, for example, a faucet (see FIG. 9 and FIG. 10), a soap, lotion or other fluid dispenser (see FIG. 11), a commercial metered shower system (see FIG. 12), an in-wall flushometer (see FIG. 13), an in-fixture urinal flushing system (see FIG. 14), an in-tank touchless toilet flushing system (see FIG. 15), a paper towel (or other item/article) dispenser (not shown), etc.

The dispensing device 20 includes a housing 22, a sensor 24, a solenoid 26 and a dispensing mechanism 28 (e.g., a flushing mechanism, a valve or other dispensing device) for dispensing a substance, material, item, article, etc. As illustrated in FIGS. 4-8I, the battery package 10, the sensor 24, the solenoid 26 and the dispensing mechanism 28 are all disposed within the housing 22 of the dispensing device 20. The sensor 24 may be a touchless sensor such that the illustrated dispensing device 20 is a touchless flushometer. The housing 22 may include a window 42 for a portion of the sensor 24 that senses a condition external to the housing 22, such as the presence of a user.

The battery package 10 powers the solenoid 26. Specifically, the battery cell 12 charges the capacitor 14, and the capacitor 14 powers the solenoid 26 when activated by the sensor 24. The solenoid 26 is activated in response to a signal from the sensor 24. For example, the sensor 24 may be a motion or light sensor, and the solenoid 26 is activated when the sensor 24 signals a flushing condition, such as the presence of a user followed by the non-presence of the user.

The battery package 10 may also power the sensor 24. For example, the battery cell 12 may power the sensor 24. In other constructions (not shown), the sensor 24 may include its own separate power source.

The dispensing mechanism 28, e.g., a water flushing mechanism of the illustrated flushometer, is illustrated in FIGS. 8A-8I. The dispensing mechanism 28 may include a piston 30, a valve seat 48, a piston bleed hole 50 and, defined by the housing 22, an inlet chamber 32, a pressure chamber or pressure envelope 34, an atmospheric vent 36, and an outlet chamber 38. In other embodiments, other dispensing mechanisms 28 may be employed (e.g., a dispensing mechanism including a diaphragm and a diaphragm vent, etc.).

Figure 8A:
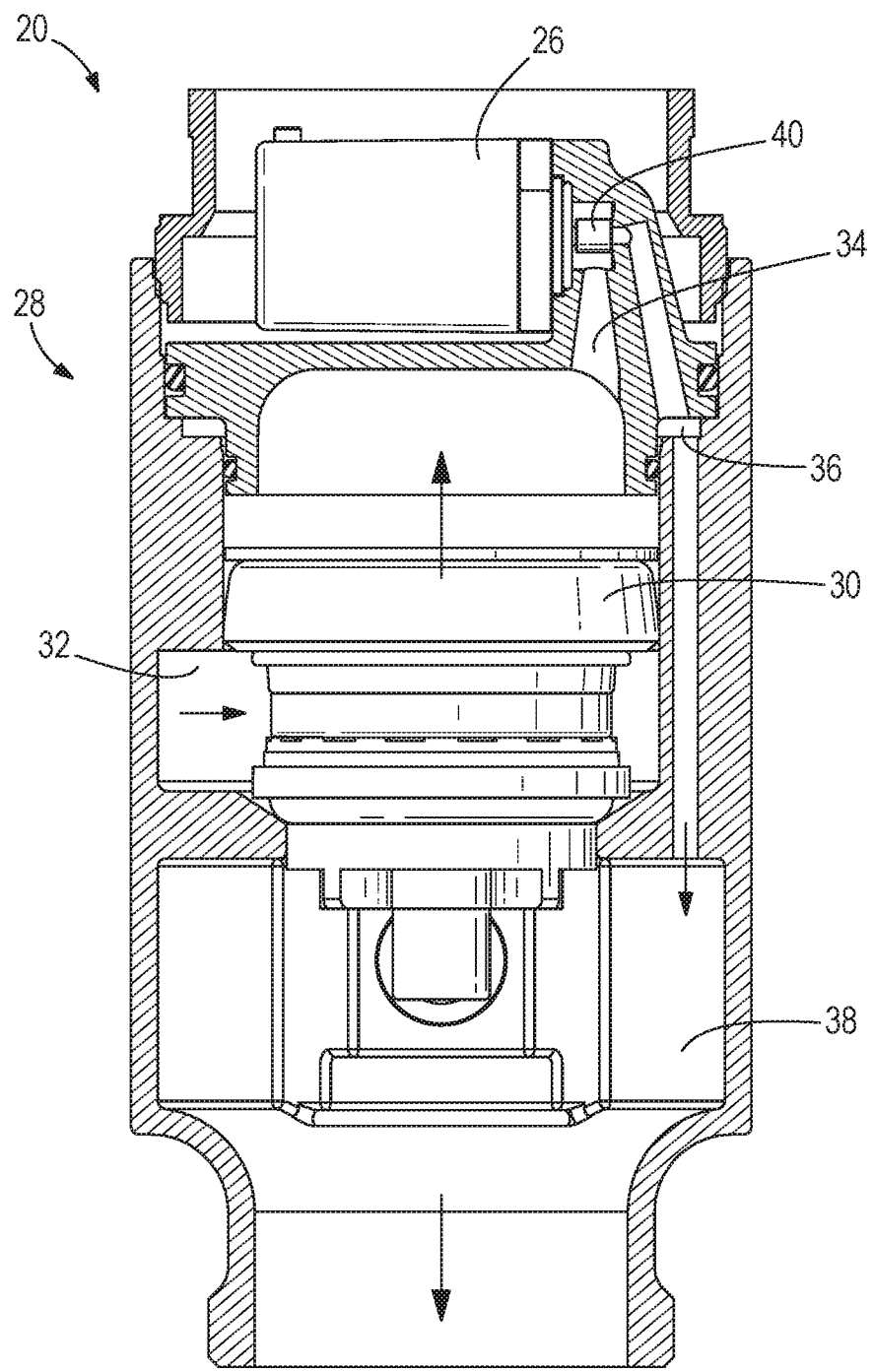
FIGS. 8A-8I are cross sectional views of a portion of the flushometer shown in FIG. 4.
Figure 8B:
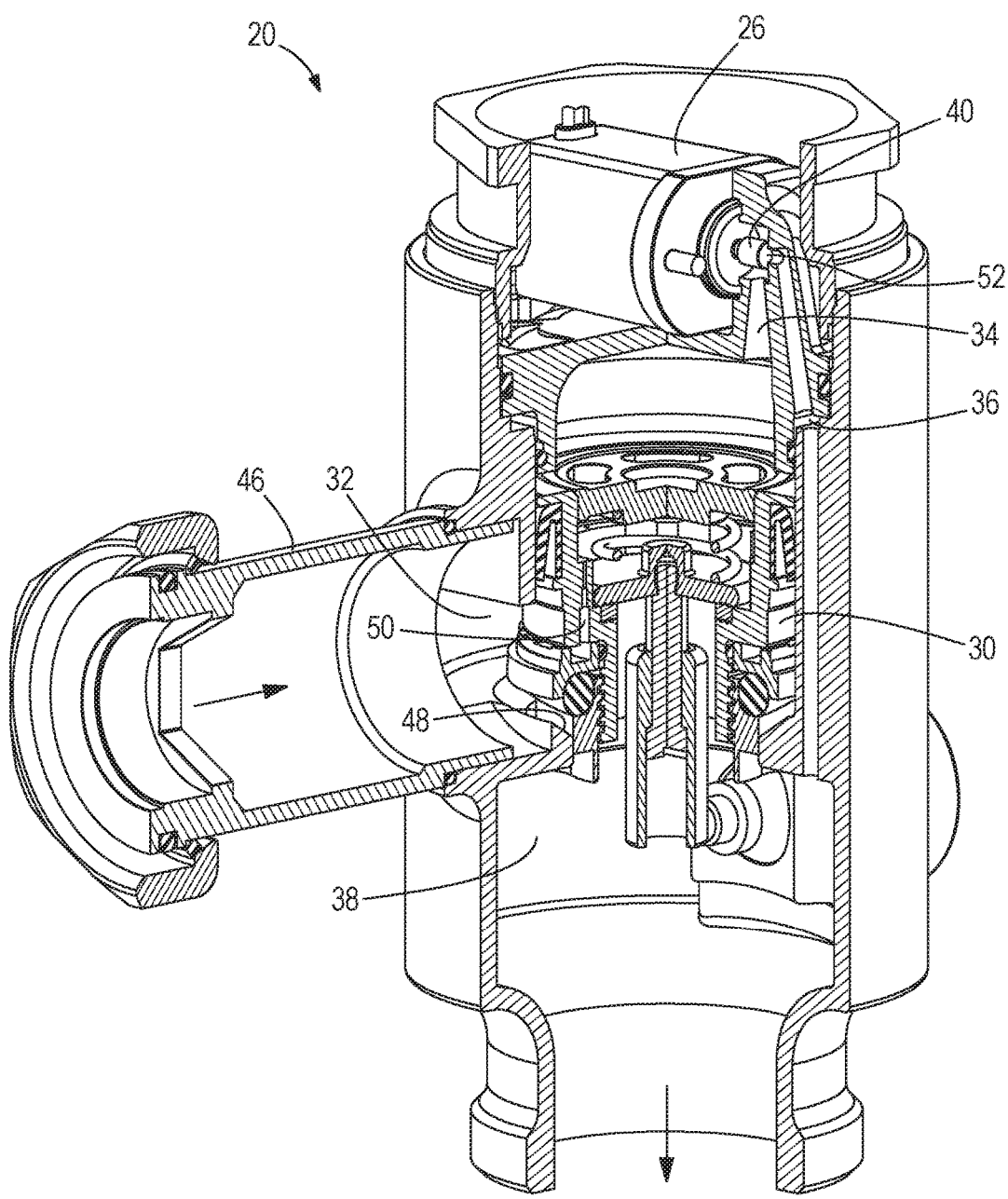

Arrows in FIGS. 8A-8I illustrate water flow in the dispensing mechanism 20. With reference to FIGS. 8A-8B, the inlet chamber 32 is fluidly connected to a source of pressurized water (not shown; e.g., utility water), receiving the pressurized water through an inlet 46 (FIG. 8B). The piston 30 includes at least one bleed hole 50 (FIG. 8B) fluidly connecting the inlet chamber 32 to the pressure envelope 34, and pressurized water flows from the inlet chamber 32 to the pressure envelope 34 through the bleed hole 50 in the piston 30. The pressure envelope 34 is connected to an atmospheric vent 36, which vents to the outlet chamber 38 and, thus, to atmosphere. The outlet chamber 38 feeds water into the flush (e.g., into a urinal) to flush the urinal (or other fixture).

The solenoid 26 includes an armature 40 movable axially between a first position (e.g., a non-dispensing or non-flush position (see FIGS. 8A-8C)), in which the solenoid 26 inhibits the dispensing device 20 from dispensing, and a second position (e.g., a dispensing or flush position (see FIGS. 8D-8E)). The solenoid 26 is energized by the capacitor 14, at least momentarily causing the armature 40 to move from the first position to the second position or from the second position to the first position. In the illustrated construction, the armature 40 latches in each of the first and second positions after the charge from the capacitor 14 ceases. Each time the solenoid 26 is energized, the armature 40 moves from one position to the other (from the first position to the second position, and vice versa).

As illustrated in FIGS. 8A-8B, in the first position, the armature 40 is extended away from the body of the solenoid 26 and fluidly separates the pressure envelope 34 from the atmospheric vent 36 such that the pressure envelope 34 cannot fluidly communicate with the atmospheric vent 36. The armature 40 includes an armature seal 52 for sealing off a vent opening or vent hole 54 (FIG. 8I) to the atmospheric vent 36.

Figure 8C:
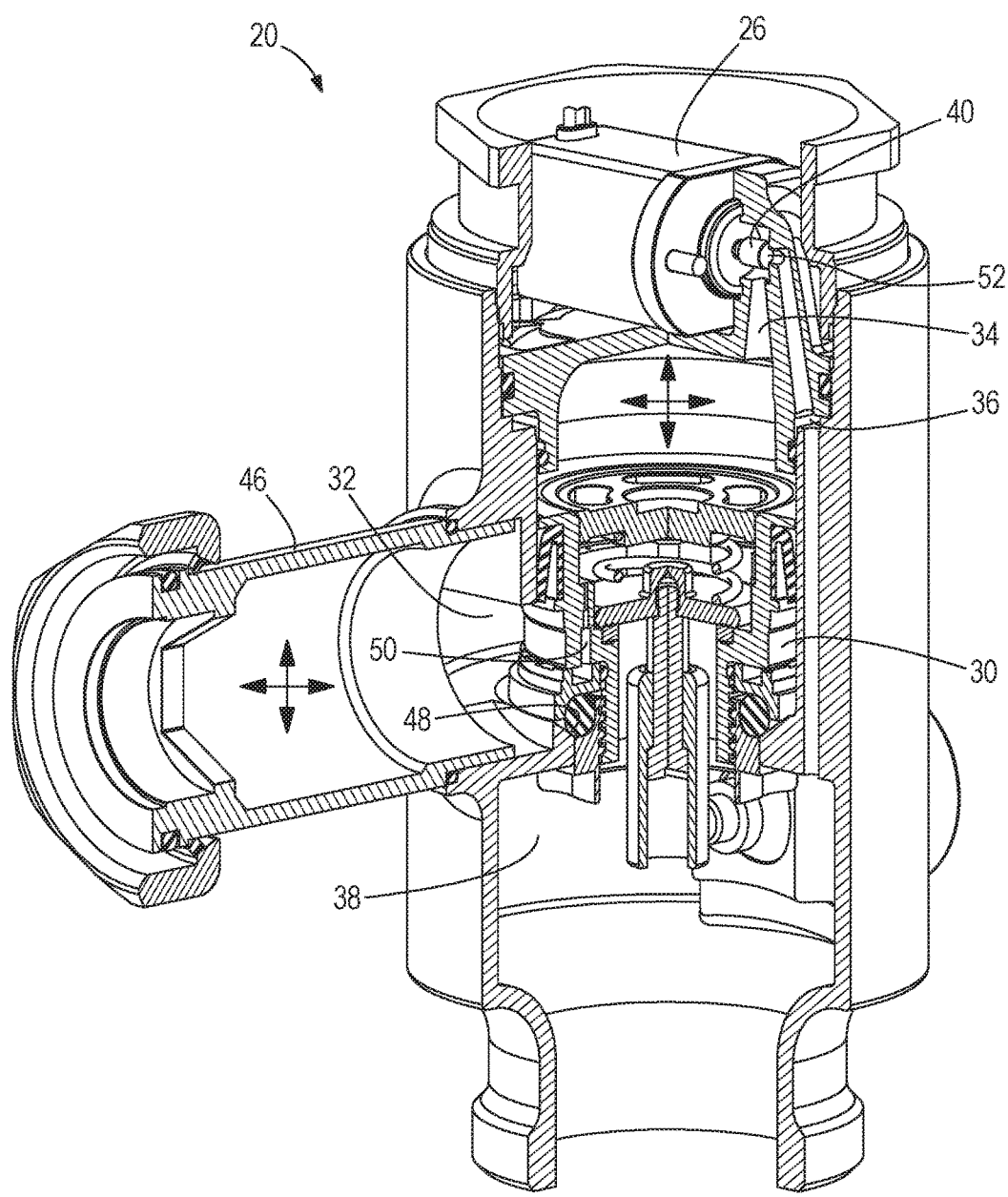

FIG. 8C illustrates the dispensing device 20 in the non-dispensing position. With the solenoid 26 de-energized and the armature 40 latched in the first position, the armature seal 52 closes off the atmospheric vent 36, allowing the water pressure above the piston 30 in the pressure envelope 34 to balance the inlet water pressure in the inlet chamber 32, which forces the piston 30 against the valve seat 48 shutting off the dispensing mechanism 28.

In the second position (see FIGS. 8D-8E), the solenoid 26, activated in response to a "flush" signal from the sensor 24, allows the dispensing device 20 to dispense. In the illustrated construction, the armature 40 retracts toward the body of the solenoid 26 and opens the passage between the pressure envelope 34 and the atmospheric vent 36, fluidly connecting the pressure envelope 34 to the atmospheric vent 36. The pressurized water vents from the pressure envelope 34 through the atmospheric vent 36 to the outlet chamber 38 and is dispensed or flushed. With the pressure envelope 34 depressurized (when the solenoid 26 is in the second position), the piston 30, which is pressurized from below by water pressure in the inlet chamber 32, displaces axially upwardly (e.g., towards the solenoid 26 in the illustrated construction), initiating the flush to the urinal or other fixture.

Figure 8D:
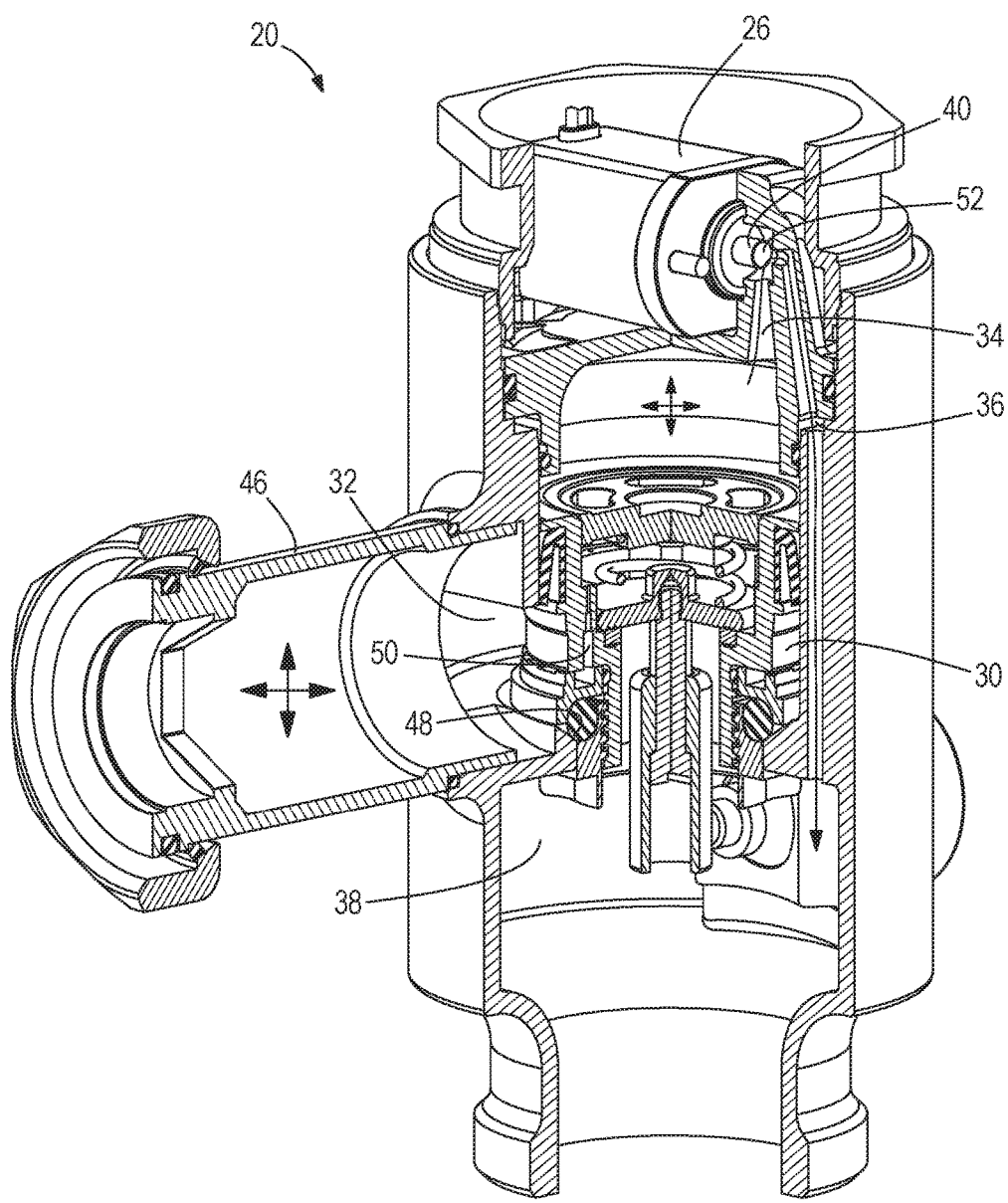

As shown in FIG. 8D, when the solenoid 26 is momentarily energized from the first position, the armature 40 retracts, allowing water above the piston 30 in the pressure envelope 34 to vent out, thereby reducing the water pressure above the piston 30 in the pressure envelope 34. A magnet or other mechanism (not shown) holds the armature 30 in place (e.g., in the latched position), eliminating the need to continuously power the solenoid 26.

Figure 8E:
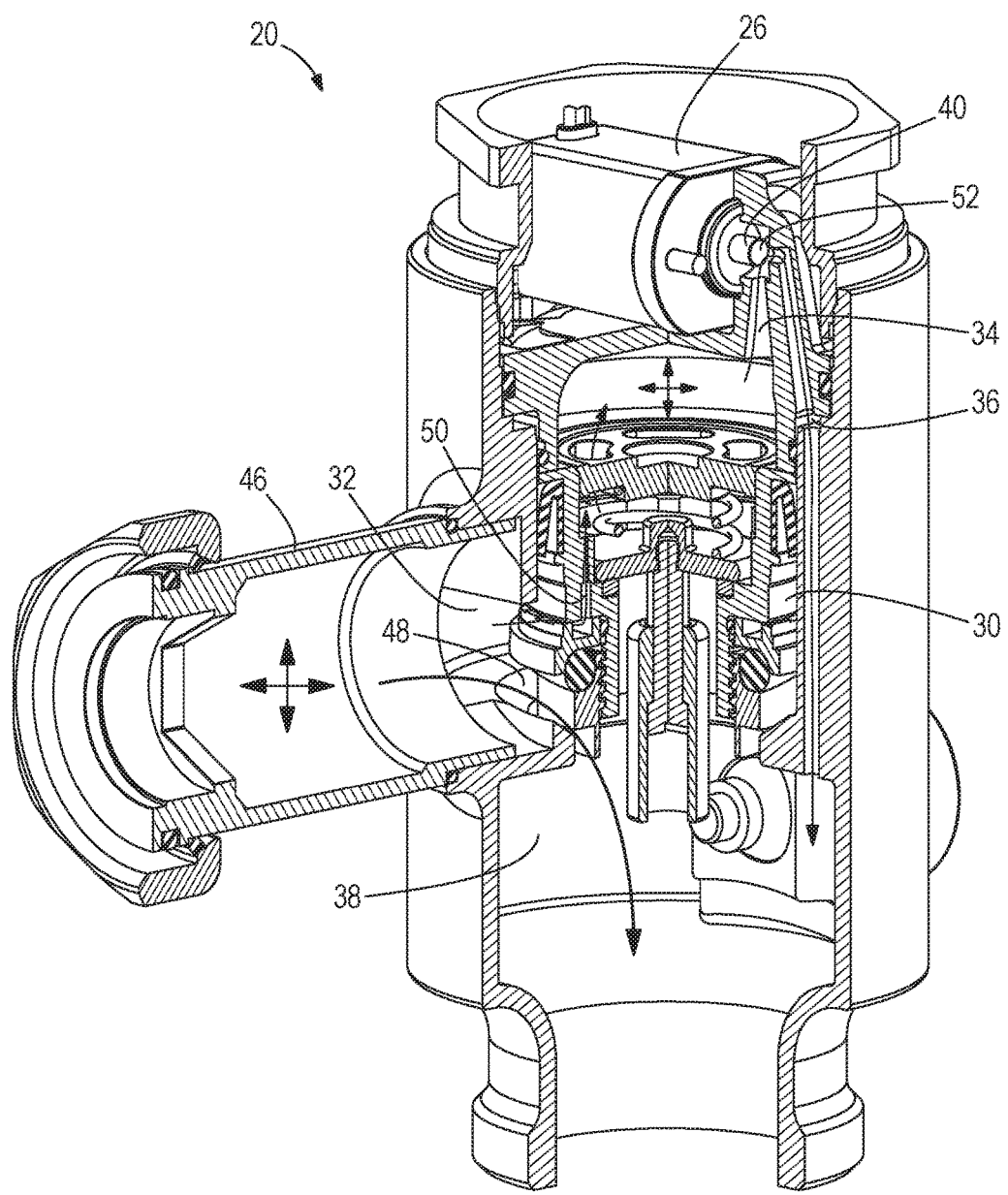

As shown in FIG. 8E, the pressure differential between the sides and top of the piston 30 forces the piston 30 up, allowing a primary flow of water to flow through the dispensing mechanism 28 between the piston 30 and valve seat 48. In addition to the primary flow through the dispensing mechanism 28, a small trickle flow continues through the piston bleed hole 50, to the pressure envelope 34 and out the atmospheric vent 36 and joins with the primary flow.

Figure 8F:
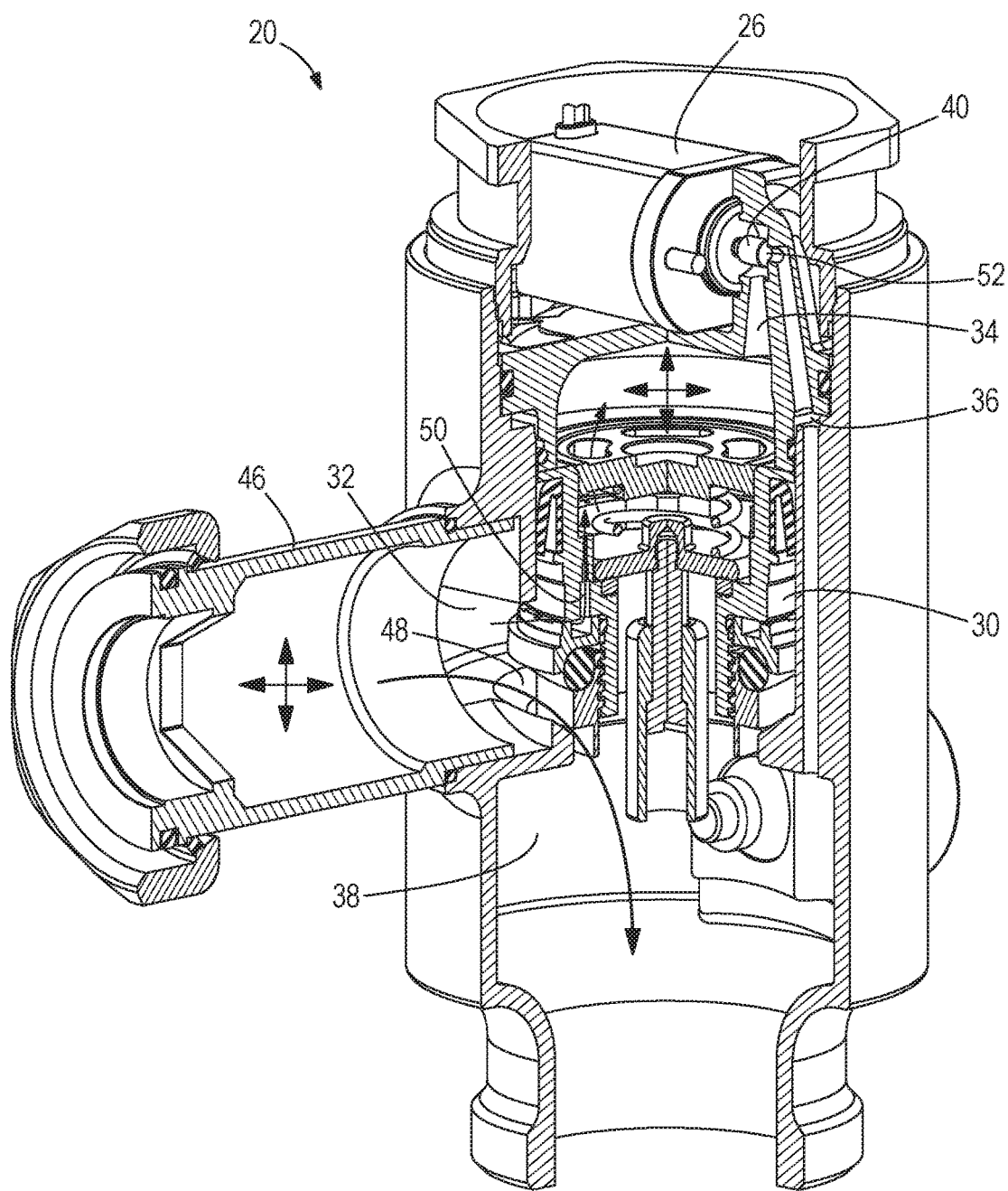

As shown in FIG. 8F, after a predetermined time period (or after a "stop flush" condition is sensed by the sensor 24), the solenoid 26 is momentarily powered in a reverse polarity, freeing the armature 40 from the "latch" (e.g., the magnetic hold) and allowing it to return to the first position (see FIGS. 8A-8C) thereby resealing the atmospheric vent 36. Even though the vent 36 is closed, water continues to trickle through the piston bleed hole 50, allowing the pressure envelope 34 to re-pressurize.

Figure 8G:
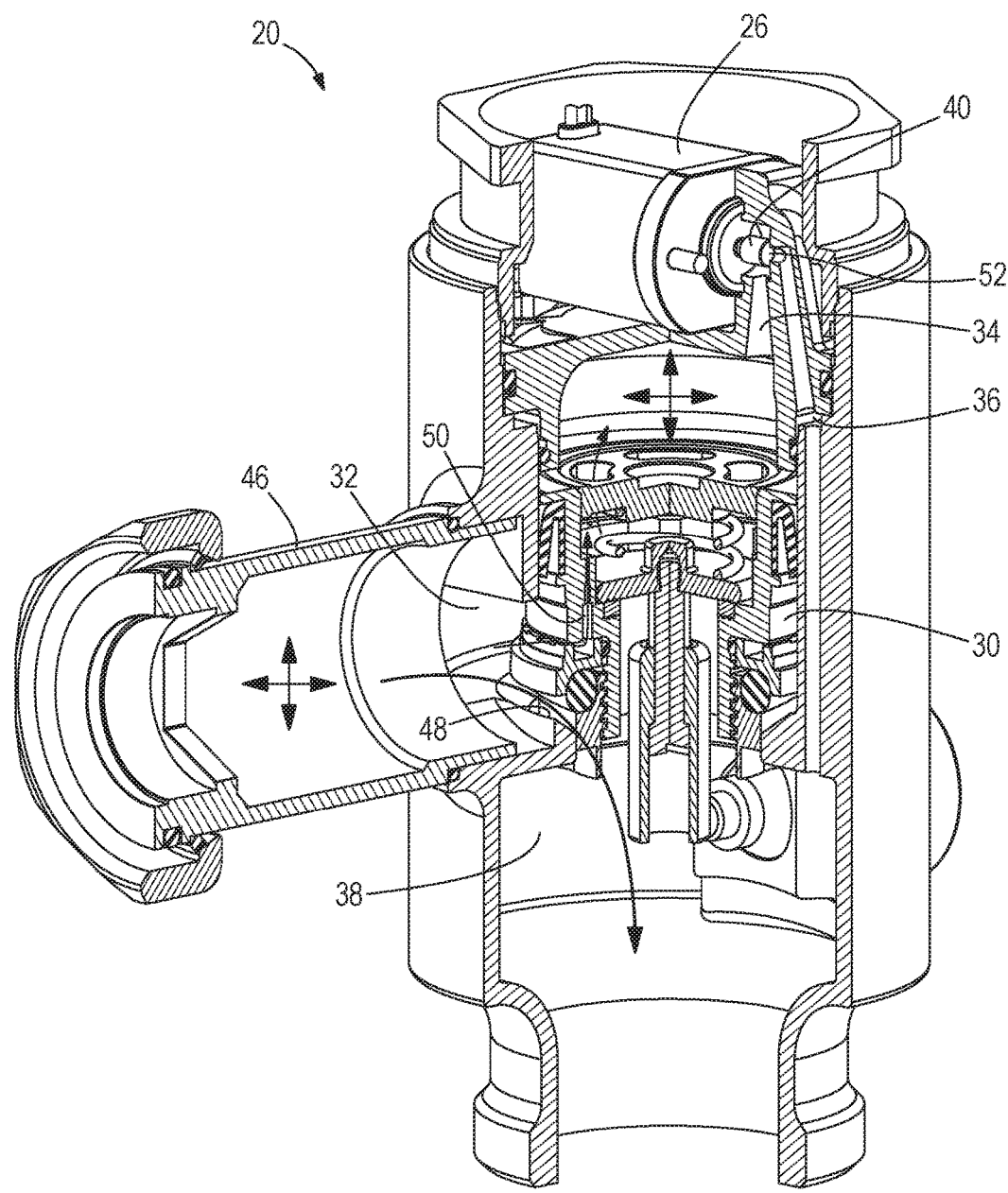
Figure 8H:
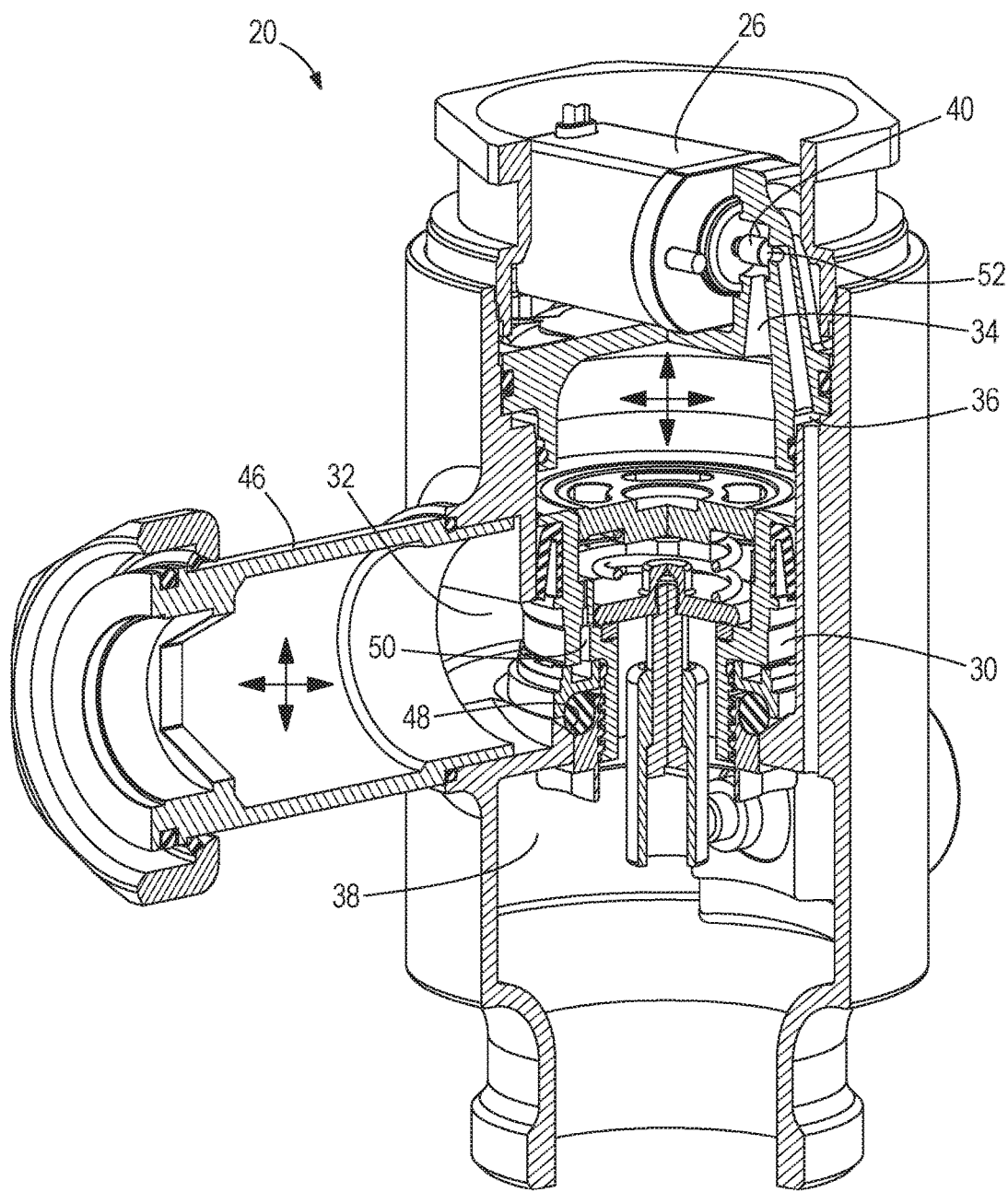

As shown in FIG. 8G, as the pressure in the pressure envelope 34 builds, the piston 30 moves back down, sealing against the valve seat 48 to terminate the flush. Movement of the piston 30 can be controlled by sizing the bleed hole 50 and determining the mass of the piston 30. As shown in FIG. 8H, when the piston 30 reseats, the pressure in the pressure envelope 34 equalizes with the inlet pressure in the inlet chamber 32.

Figure 8I:
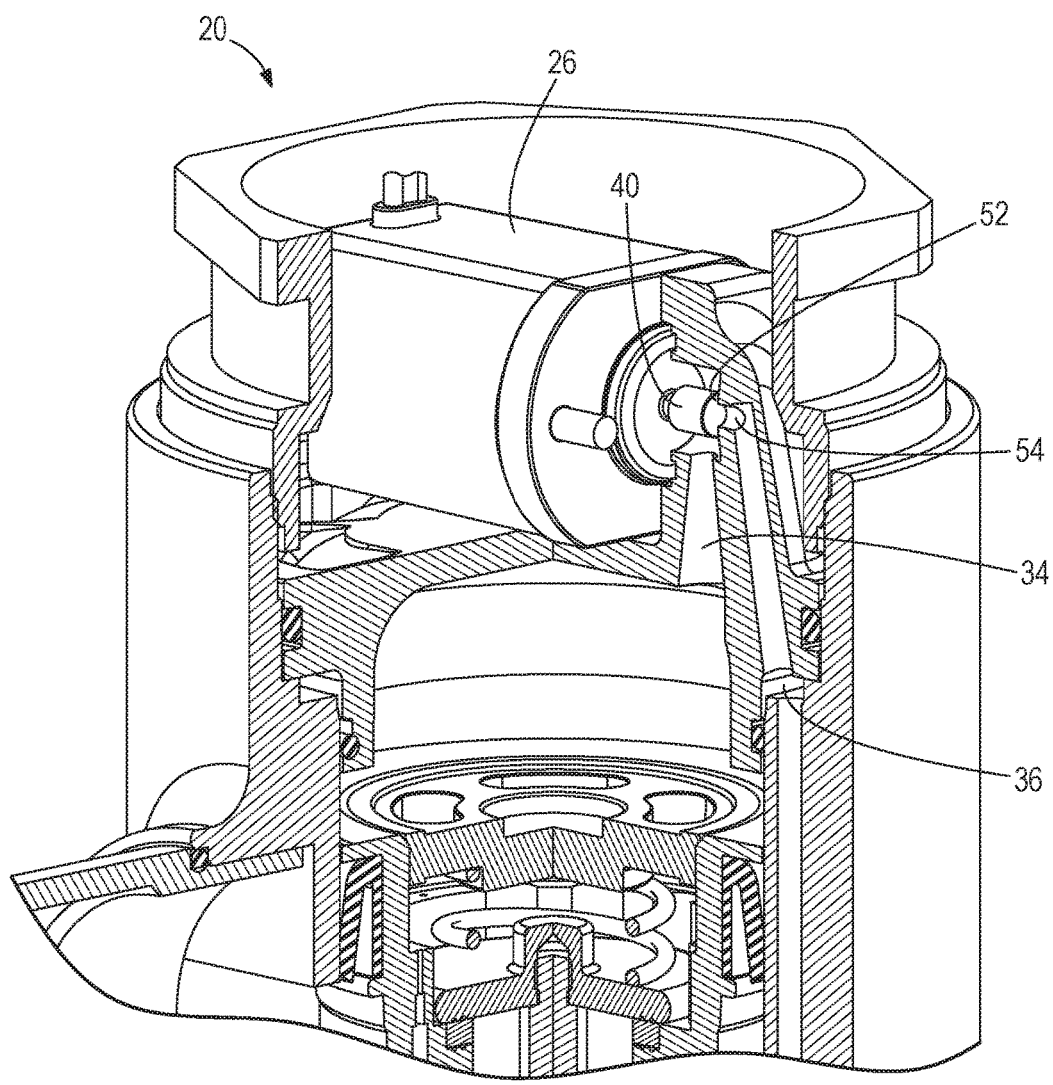

As shown in FIG. 8I, the speed at which the piston 30 jumps up at the start of the flush determines power at which the flush initiates. The size of the vent hole 54 drives piston speed by controlling the rate at which the pressure envelope 34 above the piston 30 evacuates. A larger vent hole 54 equates to a faster piston 30. However, a larger vent hole 54 may require a stronger solenoid 26 to overcome internal pressure (pressure=force/area). The force a solenoid can produce is a function of the start position of the armature 40 relative to the overall stroke. By balancing the diameter of the vent hole 54 and the retraction distance (stroke) of the armature 40 against the solenoid power, a diaphragm having a diaphragm vent can be eliminated, which may simplify the assembly, reduce material failures, etc. The illustrated dispensing mechanism 28 may also quickly purge entrapped air for consistent flush volume.

In an alternative embodiment (not shown), the solenoid uses a diaphragm to amplify the speed of the system. In such an embodiment, the armature retracts from a diaphragm vent, or diaphragm bleed hole. The smaller volume of water above the diaphragm is quickly vented, allowing the diaphragm to retract, exposing a larger portion (e.g., a larger diameter portion) of the diaphragm vent such that the larger volume of water above the piston can evacuate quickly.

In another alternative embodiment (not shown), a larger diaphragm may be used in place of the piston with a bleed hole to communicate between the inlet chamber 32 and the pressure envelope 34. The pressure envelope 34 could communicate with a diaphragm vent either by direct solenoid control or by way of a smaller diaphragm/solenoid combination.

Figure 9:
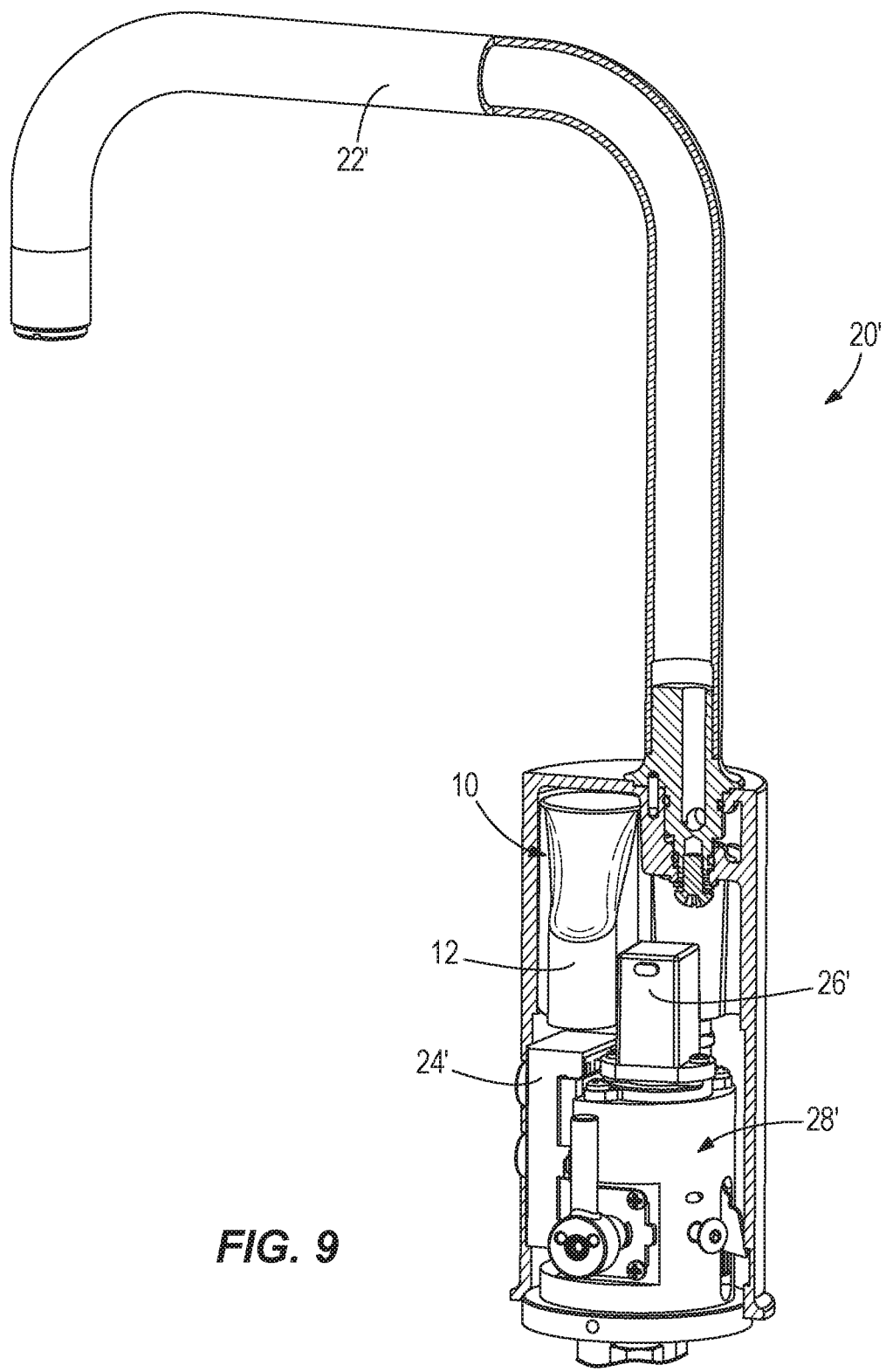
FIG. 9 is a cutout view of another dispensing device, such as a faucet, including the battery package shown in FIG. 1.
Figure 10:
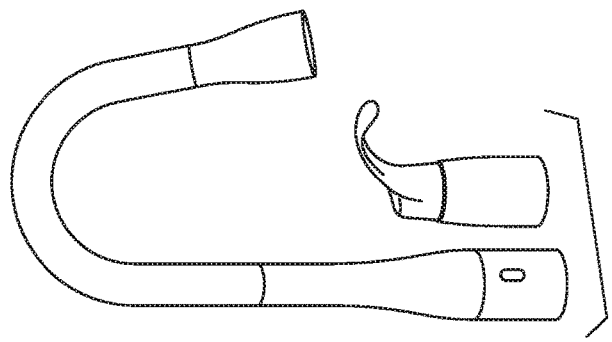
FIG. 10 is a perspective view of a faucet.

FIG. 9 illustrates another dispensing device 20', such as a faucet, including the battery package 10. The dispensing device 20' is similar to the dispensing device 20, described above and illustrated in FIGS. 4-8, and common elements are identified by the same reference number "''".

The dispensing device 20' includes a housing 22', a sensor 24', a solenoid 26' and a dispensing mechanism 28' for dispensing water. As illustrated in FIG. 9, the battery package 10, the sensor 24', the solenoid 26' and the dispensing mechanism 28' are all disposed within the housing 22' of the dispensing device 20'. The sensor 24' may be a touchless sensor such that the illustrated dispensing device 20' is a touchless faucet. The housing 22' may include a window 42' for a portion of the sensor 24' that senses a condition external to the housing 22', such as the presence of a user.

The battery package 10 powers the solenoid 26', as described above with respect to FIGS. 8A-8I. In the construction illustrated in FIG. 9, the dispensing mechanism 28' is a water dispensing mechanism for a faucet.

As illustrated in FIGS. 1-15, the invention may generally provide, among other things, a dispensing device having a compact and contaminant resistant battery package disposed within the housing of the dispensing device to power the dispensing mechanism. Thus, the need for a separate and remote battery, external from the housing of the dispensing device, may be eliminated.

What is claimed is:

1. A fluid dispensing device comprising:
   a housing defining a passage having an outlet; a sensor operable to sense a condition and to send a signal based on the sensed condition; a dispensing mechanism operable to dispense fluid through the passage and out of the outlet; a solenoid controlled, based on the signal from the sensor, to cause the dispensing mechanism to dispense fluid; and a hybrid battery including a battery cell and a capacitor disposed in the housing and operable to power the solenoid, the battery charging the capacitor, the capacitor thereafter energizing the solenoid, a space being defined between and around the battery cell and the capacitor, wherein the hybrid battery further includes resin substantially filling the space between and around the battery cell and the capacitor to inhibit airflow through the space, thereby fully encapsulating the battery cell and the capacitor.

2. The dispensing device of claim 1, wherein the hybrid battery further includes a polymeric cup, the resin substantially filling the polymeric cup such that the battery cell and the capacitor are encapsulated in the cup.

3. The dispensing device of claim 1, wherein the sensor is operable to sense a presence of a user, and wherein the sensor includes a touchless sensor.

4. The dispensing device of claim 1, wherein the housing further defines an inlet, fluid being dispensed through the inlet into the passage, through the passage and out of the outlet, wherein the housing defines an inlet chamber communicating with the inlet, an outlet chamber communicating with the outlet, a pressure chamber in communication with the inlet chamber, and a vent passage in selective communication between the pressure chamber and atmosphere, wherein the dispensing mechanism includes a piston movably supported in the passage between the inlet chamber and the outlet chamber, and wherein the solenoid is operable to selectively place the pressure chamber in communication with the vent passage to thereby cause the dispensing mechanism to dispense fluid.

5. The dispensing device of claim 4, wherein the solenoid has a first condition, in which the pressure chamber is not in communication with the vent passage, and a second condition, in which the pressure chamber is in communication with the vent passage, the solenoid being operable between the first condition and the second condition, and wherein the solenoid includes an armature movable between a first position, in which communication between the pressure chamber and the vent passage is inhibited, and a second position, in which communication between the pressure chamber and the vent passage is allowed, the armature being movable between the first position and the second position.

6. The dispensing device of claim 5, wherein the housing defines an opening between the pressure chamber and the vent passage, and wherein, in the first position, a portion of the armature closes the opening.

7. The dispensing device of claim 5, wherein the armature is latched when in the first position, the armature being movable from the first position to the second position when energized by the hybrid battery, and wherein the armature is latched when in the second position, the armature being movable from the second position to the first position when energized by the hybrid battery.

8. The dispensing device of claim 1, wherein the dispensing mechanism includes a flushometer for a bathroom fixture.

9. The dispensing device of claim 1, wherein the sensor is disposed in the housing.

10. The dispensing device of claim 1, wherein the solenoid is disposed in the housing.

11. The dispensing device of claim 1, wherein the hybrid battery is operable to power the sensor.

12. The dispensing device of claim 1, further comprising a wire, a first portion of the wire being encapsulated within the resin, and a second portion of the wire disposed outside of the resin and exposed for connection to powered devices.

13. The dispensing device of claim 1, wherein at least one of the battery cell and the capacitor includes a terminal, wherein the terminal is fully encapsulated within the resin.

14. The dispensing device of claim 1, wherein the resin includes a curable material.

15. A battery package for a fluid dispensing device, the dispensing device including a housing defining a passage having an outlet, fluid being dispensed through the passage and out of the outlet, the dispensing device also including a powered component, the battery package comprising: a battery cell; and a capacitor operable to energize the powered component, the battery cell being operable to charge the capacitor, a space being defined between and around the battery cell and the capacitor, the battery cell and the capacitor being fully encapsulated in resin, the resin substantially filling the space between and around the battery cell and the capacitor to inhibit airflow through the space, thereby forming a fluid-tight unitary battery package around the battery cell and the capacitor, the unitary battery package being supportable in the housing.

16. The battery package of claim 15, further comprising a polymeric cup, the resin substantially filling the polymeric cup such that the battery cell and the capacitor are encapsulated in the cup.

17. The battery package of claim 15, further comprising a wire, a first portion of the wire being encapsulated within the resin, and a second portion of the wire disposed outside of the resin and exposed for connection to powered devices.

18. The battery package of claim 15, wherein at least one of the battery cell and the capacitor includes a terminal, wherein the terminal is fully encapsulated within the resin.

19. A method of manufacturing a fluid dispensing device, the dispensing device also including a powered component, the method comprising: providing a housing for the fluid dispensing device, the housing defining a passage having an outlet, fluid being dispensed through the passage and out of the outlet; fully encapsulating a battery cell and a capacitor in resin as a unitary fluid-tight battery package around the battery cell and the capacitor by substantially filling a space between and around the battery cell and the capacitor with the resin, thereby inhibiting airflow through the space; connecting the battery package to a powered component, the battery cell being operable to charge the capacitor, the capacitor being operable to energize the powered component; and supporting the unitary battery package in the housing.

20. The method of claim 19, wherein the hybrid battery further includes a cup, and wherein fully encapsulating includes vacuum forming the cup to fit around the battery cell and the capacitor.

21. The method of claim 19, wherein at least one of the battery cell and the capacitor further includes a terminal, the method further comprising encapsulating the terminal within the unitary battery package.

22. The method of claim 19, wherein the hybrid battery further includes a wire, the method further comprising encapsulating a first portion of the wire within the unitary battery package, and exposing a second portion of the wire outside of the unitary battery package for connection to powered devices.

* * * * *